(12) United States Patent
Endo et al.

(10) Patent No.: US 10,592,349 B2
(45) Date of Patent: Mar. 17, 2020

(54) STORAGE CONTROL DEVICE AND STORAGE APPARATUS

(71) Applicant: FUJITSU LIMITED, Kawasaki-shi, Kanagawa (JP)

(72) Inventors: Atsushi Endo, Kawasaki (JP); Takashi Fujihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 163 days.

(21) Appl. No.: 15/695,481

(22) Filed: Sep. 5, 2017

(65) Prior Publication Data

US 2018/0074913 A1    Mar. 15, 2018

(30) Foreign Application Priority Data

Sep. 13, 2016 (JP) .................................. 2016-178561

(51) Int. Cl.
| | | |
|---|---|---|
| G06F 11/00 | (2006.01) | |
| G06F 11/14 | (2006.01) | |
| G06F 11/10 | (2006.01) | |
| G06F 3/06 | (2006.01) | |
| G11B 20/18 | (2006.01) | |

(52) U.S. Cl.
CPC .......... *G06F 11/1461* (2013.01); *G06F 3/065* (2013.01); *G06F 3/0619* (2013.01); *G06F 3/0689* (2013.01); *G06F 11/008* (2013.01); *G06F 11/1076* (2013.01); *G06F 11/14* (2013.01); *G11B 20/1883* (2013.01); *G11B 2020/1869* (2013.01); *G11B 2220/415* (2013.01)

(58) Field of Classification Search
CPC ...... G06F 3/0619; G06F 3/065; G06F 3/0689; G06F 11/008; G06F 11/1461; G11B 20/1883
See application file for complete search history.

(56) References Cited

U.S. PATENT DOCUMENTS

| | | | |
|---|---|---|---|
| 5,727,144 A | 3/1998 | Brady et al. | |
| 7,574,623 B1* | 8/2009 | Goel ...................... | G06F 11/008 |
| | | | 714/47.2 |
| 9,229,796 B1* | 1/2016 | Ma ......................... | G06F 11/008 |
| 9,244,790 B1* | 1/2016 | Ma ......................... | G06F 11/2221 |

(Continued)

FOREIGN PATENT DOCUMENTS

| | | |
|---|---|---|
| JP | 8-249133 | 9/1996 |
| JP | 2006-268502 | 10/2006 |
| JP | 2010-128773 | 6/2010 |

*Primary Examiner* — Joshua P Lottich
(74) *Attorney, Agent, or Firm* — Staas & Halsey LLP

(57) ABSTRACT

A storage control device includes a processor which performs first copy of copying first data stored in a first storage device into a first backup region upon detecting a failure presage in the first storage device. The processor performs first write of writing second data specified in a first write request to the first storage device and second write of writing the second data into the first backup region upon receiving the first write request while performing the first copy. The processor performs second copy of copying third data stored in the first backup region to a second storage device upon completing the first copy. The processor performs third write of writing fourth data specified in a second write request to the second storage device in place of the first storage device upon receiving the second write request after completion of the second copy.

12 Claims, 8 Drawing Sheets

(56) References Cited

U.S. PATENT DOCUMENTS

| | | | | |
|---|---|---|---|---|
| 2004/0230742 A1* | 11/2004 | Ikeuchi | G06F 3/061 | 711/112 |
| 2005/0086557 A1* | 4/2005 | Sato | G06F 11/008 | 714/6.12 |
| 2008/0126839 A1* | 5/2008 | Sangapu | G06F 11/1092 | 714/5.11 |
| 2008/0126855 A1* | 5/2008 | Higashijima | G06F 11/0727 | 714/16 |
| 2008/0172571 A1* | 7/2008 | Andrews | G06F 11/1076 | 714/6.12 |
| 2008/0244309 A1* | 10/2008 | Fukuyama | G06F 11/008 | 714/6.12 |
| 2009/0327603 A1* | 12/2009 | McKean | G06F 3/0617 | 711/114 |
| 2010/0077252 A1* | 3/2010 | Siewert | G06F 11/008 | 714/6.12 |
| 2010/0169575 A1* | 7/2010 | Masaki | G06F 11/1092 | 711/114 |
| 2012/0096309 A1* | 4/2012 | Kumar | G06F 11/00 | 714/6.22 |
| 2012/0137066 A1* | 5/2012 | Nolterieke | G06F 3/061 | 711/114 |
| 2014/0019813 A1* | 1/2014 | McLean | G06F 11/008 | 714/47.3 |
| 2014/0075240 A1* | 3/2014 | Maeda | G06F 11/2069 | 714/6.23 |
| 2014/0101480 A1* | 4/2014 | Tiwari | G06F 11/1662 | 714/6.22 |
| 2016/0070628 A1* | 3/2016 | Joshi | G06F 11/2094 | 714/6.22 |
| 2016/0154718 A1* | 6/2016 | Chadwell | G06F 11/1092 | 714/6.22 |
| 2016/0239397 A1* | 8/2016 | Thomas | G06F 11/2094 | |

* cited by examiner

FIG. 3

| HDD LOCATION | RAID MANAGEMENT TABLE No. | ERROR SUBSTANCE | NUMBER OF OCCURRENCE | HEAD | CYLINDER | SECTOR | ADDRESS |
|---|---|---|---|---|---|---|---|
| 0001 | 2 | SNS=03/11/00 | 1 | 0 | 124 | 0 | 0x000122 |
| | | SNS=03/11/00 | 1 | 0 | 124 | 0 | 0x000123 |
| 0203 | 7 | SNS=01/17/01 | 2 | 2 | 100 | 2 | 0x000400 |
| .. | | .. | | .. | .. | .. | .. |

| No. | SLOT | RAID GROUP No. | RAID LEVEL | MEMBER DISK#1 | MEMBER DISK#2 | ... | MEMBER DISK#$n_6$ |
|---|---|---|---|---|---|---|---|
| 1 | 0000 | 0x0000 | RAID1 | 0001 | - | ... | - |
| 2 | 0001 | 0x0001 | RAID1 | 0000 | - | ... | - |
| 3 | 0002 | 0x0002 | RAID6 | 0003 | 0004 | ... | - |
| 4 | 0003 | 0x0003 | RAID6 | 0002 | 0004 | ... | - |
| 5 | 0004 | 0x0004 | RAID6 | 0002 | 0003 | ... | - |
| .. | .. | .. | .. | .. | .. | .. | .. |
| $n_1$ | 100a | 0x0010 | RAID6-FR | 1000 | 1001 | ... | 1009 |

FIG.5

| No. | IN-USE FLAG | SLOT | TYPE | CAPACITY | ROTATIONAL SPEED (rpm) | USE | RAID LEVEL | LBA RANGE |
|---|---|---|---|---|---|---|---|---|
| 1 | IN-USE | 020b | SSD | 400GB | - | HS | RAID1 | 0x00000000 - 0x01000000 |
| | | 030b | SSD | 400GB | - | HS | RAID1 | 0x00000000 - 0x01000000 |
| | | 0400 | HDD | 600GB | 15,000 | DATA | RAID5 | 0x09800000 - 0x01000000 |
| 2 | USABLE | 040b | HDD | 600GB | 15,000 | HS | RAID5 | 0x00000000 - 0x01000000 |
| | | 050b | HDD | 600GB | 15,000 | HS | RAID5 | 0x00000000 - 0x01000000 |
| .. | .. | .. | .. | .. | .. | .. | .. | .. |

FIG. 6

| REGION No. | HDD LOCATION | RAID MANAGEMENT TABLE No. | HEAD | CYLINDER | SECTOR | ADDRESS | BACKUP START ADDRESS | BACKUP END ADDRESS |
|---|---|---|---|---|---|---|---|---|
| 1 | 1 | 2 | 0 | 124 | 0 | 0x000122 | 0x000122 - a | 0x000122 + a |
| 2 | 203 | 7 | 2 | 222 | 0 | 0x87878 | 0x87878 - b | 0x87878 + b |
| .. | .. | .. | .. | .. | .. | .. | .. | .. |

STORAGE CONTROL DEVICE AND STORAGE APPARATUS

CROSS-REFERENCE TO RELATED APPLICATION

This application is based upon and claims the benefit of priority of the prior Japanese Patent Application No. 2016-178561, filed on Sep. 13, 2016, the entire contents of which are incorporated herein by reference.

FIELD

The embodiment discussed herein is related to a storage control device and a storage apparatus.

BACKGROUND

A redundant array of inexpensive disks (RAID) apparatus is known in which a plurality of hard disk drives (HDDs) are combined to constitute a RAID group. In such a RAID apparatus, even if some disk fails, data stored therein may be guaranteed. Where a RAID apparatus includes a hot spare disk (hereinafter referred to as "HS"), the HS is temporarily used as a disk of the RAID group. When the failed disk is replaced, the RAID apparatus restores a state before the occurrence of the failed disk.

The restoration of the RAID apparatus is performed, for example, in the following procedure.

(1) A disk constituting a RAID group (the disk may be referred to as "member disk") fails.

(2) Data of the failed disk is generated from normal member disks and written into an HS (this may be referred to as "rebuild").

(3) The failed disk is replaced, and the data of the HS is written back into the new member disk (this may be referred to as "copy back").

When a presage of failure in an HDD is detected, data is copied into the HS in advance before the HDD is decoupled from the RAID apparatus (this may be referred to as "redundant copy") to secure the redundancy of the RAID group.

Related techniques are disclosed in, for example, Japanese Laid-open Patent Publication No. 08-249133, Japanese Laid-open Patent Publication No. 2006-268502, and Japanese Laid-open Patent Publication No. 2010-128773

In a case where an original member disk fails during a rebuild process or a redundant copy process, the data of the failed disk may be unable to be generated, resulting in occurrence of data loss.

The time required for rebuilding and redundant copying depends upon the rotational speed and the capacity of the HDD. Therefore, as the rotational speed of the HDD decreases or as the capacity of the HDD increases, the time required for the process increases and the possibility increases that a failure may occur in a member disk during a rebuild process or a redundant copy process.

SUMMARY

According to an aspect of the present invention, provided is a storage control device including a memory and a processor coupled to the memory. The processor is configured to detect a failure presage in a first storage device. The processor is configured to perform first copy of copying first data into a first backup region upon detecting the failure presage. The first data is stored in the first storage device. The first backup region includes a redundant array of inexpensive disks. The processor is configured to perform first write of writing second data to the first storage device and second write of writing the second data into the first backup region upon receiving a first write request from a host apparatus while performing the first copy. The second data is specified in the first write request. The processor is configured to perform second copy of copying third data to a second storage device upon completing the first copy. The third data is stored in the first backup region. The processor is configured to perform third write of writing fourth data to the second storage device in place of the first storage device upon receiving a second write request from the host apparatus after completion of the second copy. The fourth data is specified in the second write request.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of an error count table illustrated in FIG. 1;

FIG. 4 is a diagram illustrating examples of a RAID management table illustrated in FIG. 1;

FIG. 5 is a diagram illustrating examples of a backup region management table illustrated in FIG. 1;

FIG. 6 is a diagram illustrating examples of an error region management table illustrated in FIG. 1;

DESCRIPTION OF EMBODIMENT

In the following, an embodiment is described with reference to the drawings. The embodiment described below is merely an example, and there is no intention to exclude application of various modifications and technologies not specified in the embodiment. For example, the present embodiment may be implemented in various modified forms without departing from the spirit and scope thereof.

It does not intend that only the components illustrated in the figures are included, and other functions may be included.

In the following, like reference symbols in the figures denote like elements, and duplicated description thereof is omitted herein.

Embodiment

Figure 1:
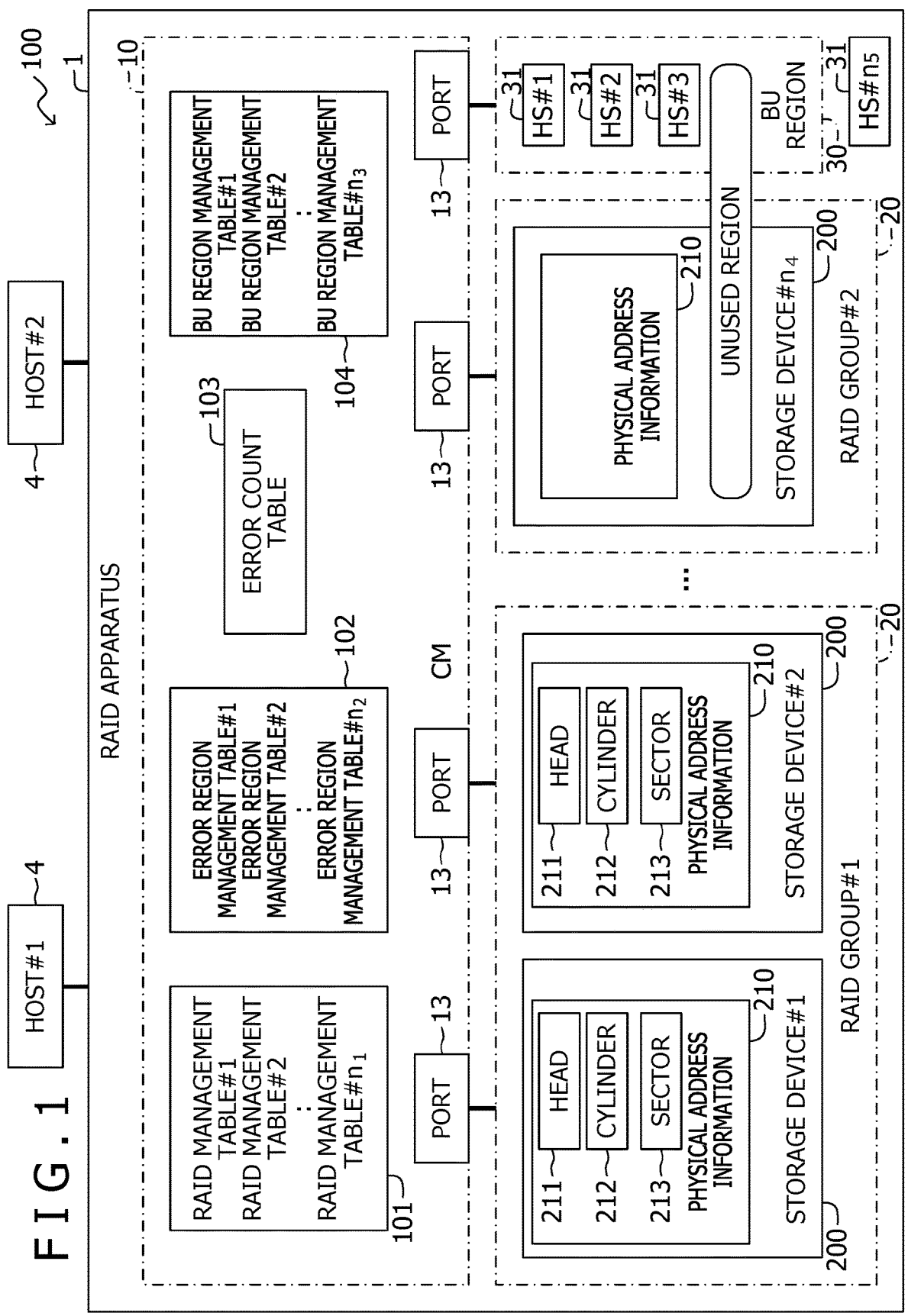
FIG. 1 is a diagram illustrating an exemplary hardware configuration of a storage system according to an embodiment.

FIG. 1 is a diagram illustrating an exemplary hardware configuration of a storage system according to an embodiment.

A storage system 100 illustrated in FIG. 1 includes a RAID apparatus 1 and host apparatuses 4 (that may be referred to as "host#1" and "host#2"). The RAID apparatus 1 provides a storage region to the host apparatuses 4.

Each host apparatus 4 is, for example, a computer having a server function. While the storage system 100 includes two hosts (host#1 and host#2) in the example illustrated in FIG. 1, the number of host apparatuses 4 provided in the storage system 100 may be changed variously.

The RAID apparatus 1 is an example of a storage apparatus. The RAID apparatus 1 includes a plurality of storage devices 200 which is described later and provides a storage region to the host apparatuses 4. The RAID apparatus 1 stores data in the plurality of storage devices 200 in a decentralized or redundant state using RAID.

The RAID apparatus 1 includes a controller module (CM) 10, the plurality of storage devices 200 (that may be referred to as "storage device#1 to storage device#$n_4$") and a plurality of HSs 31 (that may be referred to as "HS#1" to "HS#$n_5$"). Both $n_4$ and $n_5$ are natural numbers.

Each storage device 200 stores data therein. The data is read/written from/to the storage device 200. The storage device 200 is, for example, an HDD, a solid state drive (SSD) or a storage class memory (SCM).

The storage device 200 stores physical address information 210 in a part of the storage region thereof. The physical address information 210 includes a head 211, a cylinder 212, and a sector 213 that indicate a physical storage position of data stored in the storage device 200. It is to be noted that, in FIG. 1, illustration of the head 211, the cylinder 212, and the sector 213 of the physical address information 210 in storage device#$n_4$ is omitted.

At least part of the plurality of storage devices 200 provided in the RAID apparatus 1 belongs to a RAID group 20 (that may be referred to as "RAID group#1 or RAID group#2"). In the example of FIG. 1, storage device#1 and storage device#2 belong to RAID group#1, and storage device#$n_4$ belongs to RAID group#2. The RAID group 20 is a set of a plurality of physical disks (for example, "storage devices 200") constituting one logical volume.

Data stored in a storage device 200, in which a failure or a failure presage (that may be collectively referred to as "error") is detected, is copied to a predetermined HS 31 among the plurality of HSs 31. Hereinafter, a storage device 200 in which an error is detected may be referred to as "suspected disk". According to the embodiment, the data stored in the suspected disk is first copied into a backup region 30 (in FIG. 1, "BU region"), which is used for temporarily storing the data for backup, then the data is copied from the backup region 30 to the predetermined HS 31. The backup region 30 is a RAID including a part of the plurality of HSs 31. In the example illustrated in FIG. 1, HS#1 to HS#3 are defined as the backup region 30.

In the example illustrated in FIG. 1, storage device#$n_4$ that belongs to RAID group#2 and HS#1 to HS#3 that belong to the backup region 30 each include unused regions in which no data is stored. Unused regions of the storage devices 200 may be used as the backup region 30. For example, HSs 31 and unused regions of the storage devices 200 may be used as the backup region 30. In a case where no HS 31 including unused regions is provided in the RAID apparatus 1, only unused regions of the storage devices 200 may be used as the backup region 30.

The CM 10 is a control device for performing various controls in accordance with a storage access request (that may be referred to as "access control signal" or "host input/output (I/O)") from the host apparatus 4.

The CM 10 includes a central processing unit (CPU) 11 which is described later with reference to FIG. 2, a memory 12 which is described later with reference to FIG. 2, and four ports 13. It is to be noted that, although the RAID apparatus 1 in the example illustrated in FIG. 1 includes a single CM 10, the number of CMs is not limited to one. The RAID apparatus 1 may include a slave CM in addition to the master CM 10 having a function of the CPU 11, which is described later with reference to FIG. 2. The RAID apparatus 1 may include a CM 10 for each RAID group 20, and the CMs 10 in the respective RAID groups 20 may function in cooperation with each other.

Each port 13 is an interface for communicably coupling the CM 10 and each storage device 200 with each other and is, for example, a fibre channel (FC) adapter. The CM 10 performs writing and reading out of data to and from the storage device 200 through the port 13. It is to be noted that, while the CM 10 in the example illustrated in FIG. 1 includes four ports 13, the number of ports 13 is not limited to four, and the CM 10 may include three or less or five or more ports 13.

In the memory 12 provided in the CM 10, information relating to a plurality of RAID management tables 101, a plurality of error region management tables 102, an error count table 103, and a plurality of backup region management tables 104 is stored. The RAID management tables 101 may be referred to as RAID management table#1 to RAID management table#$n_1$; the error region management tables 102 may be referred to as error region management table#1 to error region management table#$n_2$; and the backup region management tables 104 may be referred to as BU region management table#1 to BU region management table#$n_3$. All of $n_1$, $n_2$, and $n_3$ are natural numbers.

Figure 2:
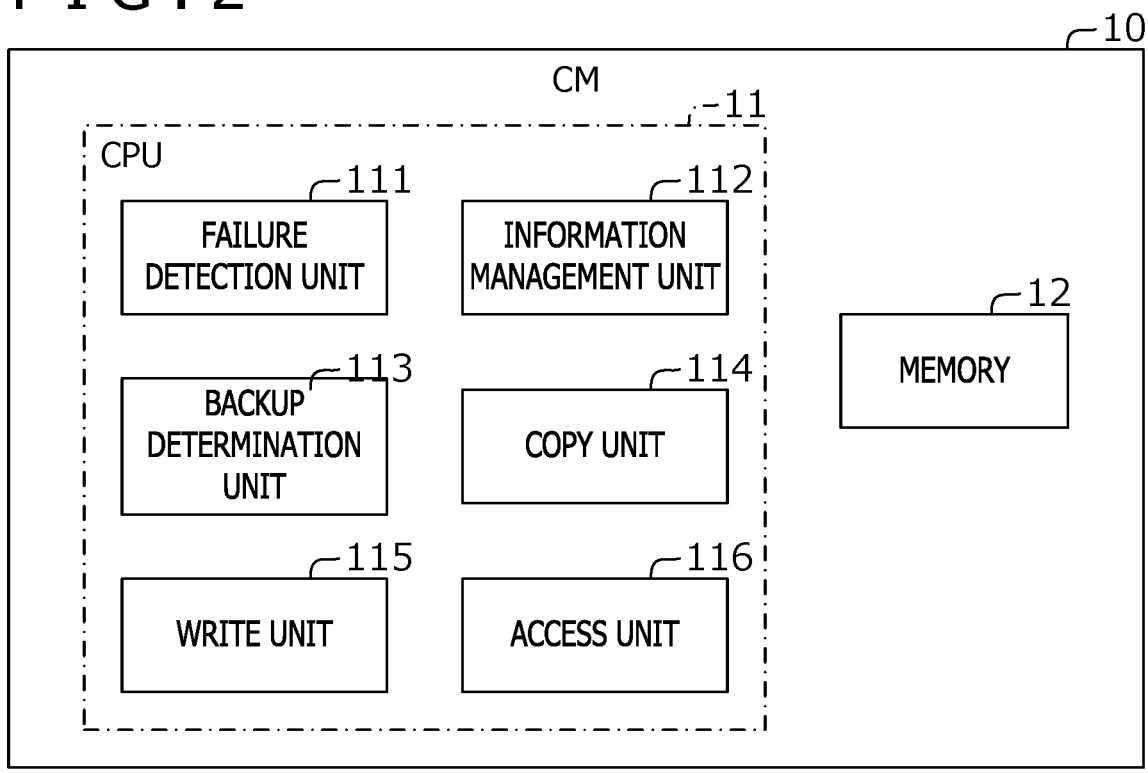
FIG. 2 is a diagram illustrating an exemplary functional configuration of a CM illustrated in FIG. 1.

FIG. 2 is a diagram illustrating an exemplary functional configuration of the CM 10 illustrated in FIG. 1.

The CM 10 includes the CPU 11 and the memory 12 and the four ports 13 illustrated in FIG. 1 as described above.

The memory 12 is, for example, a storage device that includes a read-only memory (ROM) or a random access memory (RAM) or both. In the ROM of the memory 12, programs such as a basic input/output system (BIOS) may be written. A software program stored in the memory 12 may be suitably read and executed by the CPU 11. The RAM of the memory 12 may be utilized as a primary recording memory or a working memory.

The CPU 11 is a processing device that performs various controls and arithmetic operations and implements various functions by executing an operating system (OS) or a program stored in the memory 12. For example, the CPU 11 may function as a failure detection unit 111, an information management unit 112, a backup determination unit 113, a copy unit 114, a write unit 115, and an access unit 116 as illustrated in FIG. 2.

It is to be noted that the program for implementing the functions as the failure detection unit 111, the information management unit 112, the backup determination unit 113, the copy unit 114, the write unit 115, and the access unit 116 may be provided in a form in which the program is recorded in a computer-readable recording medium such as a flexible disk, a compact disc (CD) (CD-ROM, CD-recordable (R), CD-rewritable (RW), or the like), a digital versatile disc (DVD) (DVD-ROM, DVD-RAM, DVD-R, DVD+R, DVD-RW, DVD+RW, HD DVD, or the like), a Blu-ray disc, a magnetic disk, an optical disk, or a magneto-optical disk. A computer (in the present embodiment, the CPU 11) may read the program from the recording medium through a reading apparatus (not illustrated) and transfer the program to an internal recording device or an external recording device to store the program therein. Alternatively, the program may be recorded into a storage device (recording medium) such as a magnetic disk, an optical disk or a magneto-optical disk in advance to be provided from the storage device to a computer through a communication path.

When the functions as the failure detection unit 111, the information management unit 112, the backup determination unit 113, the copy unit 114, the write unit 115, and the access unit 116 are implemented, the program stored in the internal storage device (in the present embodiment, in the memory 12) may be executed by the computer (in the present embodiment, by the CPU 11). Alternatively, the program recorded in the recording medium may be read and executed by the computer.

The failure detection unit 111 is an example of a detection unit which detects an error in a storage device 200.

FIG. 3 is a diagram illustrating an example of the error count table 103 illustrated in FIG. 1.

The failure detection unit 111 manages the error count table 103. When the failure detection unit 111 detects an error in any storage device 200, the failure detection unit 111 registers the substance of the detected error into the error count table 103.

The error count table 103 stores information regarding the substance of an error occurring in the storage device 200, the number of occurrence of the error, and a location of occurrence of the error in association with each other. The error count table 103 includes columns for "HDD location", "RAID management table No.", "error substance", "number of occurrence", "head", "cylinder", "sector", and "address".

In "HDD location", information for identifying a location at which the storage device 200 (referred to as "suspected disk") in which the error is detected is installed in the RAID apparatus 1 (or "port 13 to which the storage device 200 is coupled") is registered. In the example illustrated in FIG. 3, "0001" and "0203" are registered in "HDD location".

In "RAID management table No.", information for identifying a RAID management table 101, in which the suspected disk is registered, is registered. In the example illustrated in FIG. 3, "2" and "7" are registered in "RAID management table No.".

In "error substance", information indicative of the substance of the error occurring in the suspected disk is registered. In the example illustrated in FIG. 3, "SNS=03/11/00" and "SNS=01/17/01" are registered in "error substance".

In "number of occurrence", the number of times by which the identical error substance occurs in the same region of the suspected disk is registered. In the example illustrated in FIG. 3, "1" and "2" are registered in "number of occurrence".

In "head", the head 211 of the suspected disk is registered. In the example illustrated in FIG. 3, "0" and "2" are registered in "head".

In "cylinder", the cylinder 212 of the suspected disk is registered. In the example illustrated in FIG. 3, "124" and "100" are registered in "cylinder".

In "sector", the sector 213 of the suspected disk is registered. In the example illustrated in FIG. 3, "0" and "2" are registered in "sector".

In "address", an address for identifying a region of the suspected disk is registered. In the example illustrated in FIG. 3, "0x000122", "0x000123", and "0x000400" are registered in "address".

The information management unit 112 manages the RAID management tables 101, the error region management tables 102, and the backup region management tables 104.

FIG. 4 is a diagram illustrating examples of the RAID management table 101 illustrated in FIG. 1. In FIG. 4, RAID management table#1 to RAID management table#$n_1$ are illustrated.

When the information management unit 112 sets a RAID group 20 to the RAID apparatus 1, the information management unit 112 registers "RAID level" and information indicative of storage devices 200 constituting the RAID group 20 into a RAID management table 101.

The RAID management table 101 stores therein information indicative of the storage devices 200 (that may be referred to as "member disks") belonging to each RAID group 20. The RAID management table 101 includes columns for "No.", "slot", "RAID group No.", "RAID level", and "member disk#1" to "member disk#$n_6$". $n_6$ is a natural number.

In "No.", the number for identifying each of RAID management table#1 to RAID management table#$n_1$ is registered. In the example illustrated in FIG. 4, "1" to "$n_1$" are registered in "No.".

In "slot", information for identifying a slot (not illustrated) of the RAID apparatus 1 in which the storage devices 200 constituting the RAID group 20 are installed is registered. In the example illustrated in FIG. 4, "0000" to "0004" and "100a" are registered in "slot".

In "RAID group No.", information for identifying the RAID group 20 is registered. In the example illustrated in FIG. 4, "0x0000" to "0x0004" and "0x0010" are registered in "RAID group No.".

In "RAID level", a RAID level set to the RAID group 20 is registered. In the example illustrated in FIG. 4, "RAID1", "RAID6", and "RAID6-FR" are registered in "RAID level".

In "member disk#1" to "member disk#$n_6$", information for identifying storage devices 200 belonging to the RAID group 20 is registered. In the example illustrated in FIG. 4, in "member disk#1" to "member disk#$n_6$", "0000" to "0004", "1000", "1001", and "1009" are registered. In the example illustrated in FIG. 4, "–" registered in "member disk#2" to "member disk#$n_6$" indicates that no storage device 200 belongs.

FIG. 5 is a diagram illustrating examples of the backup region management table 104 illustrated in FIG. 1. In FIG. 5, backup region management table#1 and backup region management table#2 are illustrated.

The information management unit 112 registers, when setting the HSs 31, the backup region 30 and unused regions of the storage devices 200 into the backup region management table 104. As illustrated in FIG. 1, two or more HSs 31 may be designated as the backup region 30.

Each backup region management table 104 stores therein information regarding HSs 31 and so forth used in a backup process. The backup region management table 104 includes columns for "No.", "in-use flag", "Slot", "type", "capacity", "rotational speed (rpm)", "use", "RAID level", and "logical block addressing (LBA) range". It is to be noted that rpm is a unit and an abbreviation of revolution per minute.

In "No.", the number for identifying backup region management table#1 to backup region management table#$n_3$ is registered. In the example illustrated in FIG. 5, "1" and "2" are registered in "No.".

In "in-use flag", a flag indicating that a storage device 200 or an HS 31 is in use may be registered. Further, in "in-use flag", a flag indicating that a storage device 200 or an HS 31 is usable ("not in use") may be registered. In the example illustrated in FIG. 5, "in-use" and "usable" are registered in "in-use flag".

In "Slot", information for identifying a slot (not illustrated) of the RAID apparatus 1 in which a storage device 200 or an HS 31 is installed is registered. In the example illustrated in FIG. 5, "020b", "030b", "0400", "040b", and "050b" are registered in "Slot".

In "type", a type of a storage device 200 or an HS 31 is registered. In the example illustrated in FIG. 5, "SSD" or "HDD" is registered in "type".

In "capacity", the storage capacity of a storage device 200 or an HS 31 is registered. In the example illustrated in FIG. 5, "400 GB" and "600 GB" are registered in "capacity".

In "rotational speed (rpm)", in a case where a storage device 200 or an HS 31 is an HDD, a value indicative of a rotational speed of the HDD is registered. In the example illustrated in FIG. 5, "15,000" is registered in "rotational speed (rpm)".

In "use", a distinction between a storage device 200 for storing data (DATA) and an HS 31 for storing a copy of data stored in a storage device 200 is registered. In the example illustrated in FIG. 5, "HS" and "DATA" are registered in "use".

In "RAID level", a RAID level set to a storage device 200 or an HS 31 is registered. In the example illustrated in FIG. 5, "RAID1" and "RAID5" are registered in "RAID level".

In "LBA range", a range of logical addresses for identifying unused regions of a storage device 200 or an HS 31 is registered. In the example illustrated in FIG. 5, "0x00000000-0x01000000" and "0x09800000-0x01000000" are registered in "LBA range".

FIG. 6 is a diagram illustrating examples of the error region management table 102 illustrated in FIG. 1. In FIG. 6, error region management table#1 and error region management table#2 are illustrated.

When an error in a storage device 200 is detected by the failure detection unit 111, the information management unit 112 registers information regarding the error into the error region management table 102.

For example, the information management unit 112 acquires information of a head 211, a cylinder 212, and a sector 213 included in the physical address information 210 (refer to FIG. 1) regarding a region in which an error occurs from the suspected disk. Then, the information management unit 112 registers the acquired head 211, cylinder 212, and sector 213 into the error region management table 102 together with information included in the RAID management table 101.

The information management unit 112 may delete, after a copy process performed by the copy unit 114 which is described later is completed, the error region management table 102 including data relating to the suspected disk.

The error region management table 102 stores therein an occurrence position of an error in the suspected disk (the position may be referred to as "failure presage position"). The error region management table 102 includes columns for "region No.", "HDD location", "RAID management table No.", "head", "cylinder", "sector", "address", "backup start address", and "backup end address".

In "region No.", the number for identifying any of error region management table#1 to error region management table#$n_2$ is registered. In the example illustrated in FIG. 6, "1" and "2" are registered in "region No.".

In "HDD location", information for identifying a slot (not illustrated) of the RAID apparatus 1, in which the suspected disk is installed. In the example illustrated in FIG. 6, "1" and "203" are registered in "HDD location".

In "RAID management table No.", the number for identifying a RAID management table 101 in which the RAID group 20 including the suspected disk is registered. In the example illustrated in FIG. 6, "2" and "7" are registered in "RAID management table No.".

In "head", "cylinder", and "sector", the head 211, the cylinder 212, and the sector 213 of a region of the suspected disk are registered, respectively. In the example illustrated in FIG. 6, "0" and "2" are registered in "head"; "124" and "222" are registered in "cylinder; and "0" is registered in "sector".

In "address", an address for identifying a region of the suspected disk is registered. In the example illustrated in FIG. 6, "0x000122" and "0x87878" are registered in "address".

In "backup start address", an address at which backup of data of the suspected disk is started is registered. In the example illustrated in FIG. 6, "0x000122−a" and "0x87878−b" are registered in "backup start address".

In "backup end address", an address at which backup of data of the suspected disk is ended is registered. In the example illustrated in FIG. 6, "0x000122+a" and "0x87878+b" are registered in "backup end address".

For an error occurrence region whose "region No." is indicated by "1", backup is performed in a region of "0x000122−a" to "0x000122+a" around "0x000122" that is "address" at which an error occurs. For an error occurrence region whose "region No." is indicated by "2", backup is performed in a region of "0x87878−b" to "0x87878+b" around "0x87878" that is "address" at which an error occurs. "±a" and "±b" in "backup start address" and "backup end address" may be called margins with which backup is performed.

The backup determination unit 113 determines, based on the information included in the error count table 103, whether to perform ordinary rebuilding and redundant copying or to generate backup data to write the backup data into the backup region 30. In a case where information included in the error count table 103 is registered as a presage of a failure expected to occur in the suspected disk, the backup determination unit 113 determines to perform backup into the backup region 30.

In a case where the detected error is classified into a statistical point addition system, such as a recovered error, an unrecovered error, or the like, the backup determination unit 113 may determine that the suspected disk is relievable, and thus determine to perform backup. On the other hand, in a case where the detected error is an error that does not allow continuous use of the suspected disk, such as a failure of the head (not illustrated) of the suspected disk or a timeout, the backup determination unit 113 may determine that the suspected disk is not relievable, and thus determine to perform ordinary rebuilding and redundant copying. The backup determination unit 113 may refer to the column for "error substance" in the error count table 103 (refer to FIG. 3) to determine whether or not the suspected disk is relievable.

In a case where a plurality of regions of HSs 31 are usable for backup when the backup determination unit 113 determines to perform backup into the backup region 30, the backup determination unit 113 selects a region of HSs 31 to be used for backup. The backup determination unit 113 may select a region of HSs 31 to be used for backup in a case where the backup region management table 104 includes a plurality of regions (that may be referred to as "backup candidates") for which "usable" is registered in "in-use flag".

The backup determination unit 113 selects a region of HSs 31 to be used for backup from among the backup candidates giving the priority, for example, in the following order of (1) to (3).

(1) In a case where the backup candidates include both HDD candidates and SSD candidates, SSD candidates are selected.

(2) In a case where all of the backup candidates are HDD candidates, HDD candidates including HDDs having the highest rotational speed are selected.

(3) In a case where resulting backup candidates include a plurality of HDD candidates or a plurality of SSD candidates, a backup candidate including HSs 31 having the smallest used region, which is used by other RAID groups 20, is selected.

That is, the backup determination unit 113 is an example of a selection unit that selects HSs 31 having the highest writing speed as HSs 31 to be used for backup.

The copy unit 114 copies data stored in the suspected disk to the HSs 31 selected by the backup determination unit 113. Specifically, the copy unit 114 copies data stored in the suspected disk temporarily into an arbitrary region of the backup region 30. After the copy into the backup region 30 is completed, the copy unit 114 copies the data copied in the backup region 30 into a predetermined HS 31. "The copy into the backup region 30 is completed" may be rephrased as "data in the backup region 30 becomes equivalent to the data in the suspected disk".

That is, the copy unit 114 is an example of a first copy unit that copies, when a failure presage is detected by the failure detection unit 111, the data stored in the suspected disk into the backup region 30 including a RAID. Further, the copy unit 114 is an example of a second copy unit that copies the data stored in the backup region 30 further into a predetermined HS 31.

Here, as "predetermined HS 31", an HS 31 that is of a same type and has a same capacity as the suspected disk may be selected preferentially.

In a case where the backup region 30 into which data copy is to be performed by the copy unit 114 includes a plurality of HSs 31, the copy unit 114 may perform the data copy in a distributed manner into the plurality of HSs 31. In a case where the backup region 30 includes only one HS 31, the copy unit 114 may copy data stored in the suspected disk into the one HS 31 included in the backup region 30.

In a case where the amount of data to be copied is greater than the capacity of the backup region 30, the copy unit 114 may directly copy the data stored in the suspected disk into the predetermined HS 31 described above. In a case where the predetermined HS 31 described above does not exist in the RAID apparatus 1, the copy unit 114 may copy the data copied in the backup region 30 into a storage device 200 which replaces the suspected disk to be incorporated as a new member disk.

The write unit 115 writes data into the suspected disk in accordance with a write request received from the host apparatus 4. During the data copy into the backup region 30 performed by the copy unit 114, the write unit 115 performs, data write of the same data into the suspected disk and the backup region 30 in parallel a.

In a case where the backup region 30, into which data write is to be performed by the write unit 115, includes a plurality of HSs 31, the write unit 115 may perform the data write in a distributed manner into the plurality of HSs 31. On the other hand, in a case where the backup region 30 includes only one HS 31, the write unit 115 may write data, which is written into the suspected disk, into the one HS 31 included in the backup region 30.

In a case where the amount of data to be written is greater than the capacity of the backup region 30, the write unit 115 may write the data, which is written into the suspected disk, directly into the predetermined HS 31 described above.

After the data copy into the backup region 30 performed by the copy unit 114 is completed, the write unit 115 may cancel the data write into the suspected disk.

While backup of data is being performed by the copy unit 114 and the write unit 115, the access unit 116 performs a read/write process of reading/writing data from/to the suspected disk and the HSs 31 in accordance with a data access request received from the host apparatus 4.

After the data copy to the predetermined HS 31 by the copy unit 114 described above is completed, the access unit 116 performs data access to the predetermined HS 31 in place of the suspected disk. In other words, the access unit 116 incorporates the predetermined HS 31, to which the data copy is completed, into the RAID group 20 including the suspected disk, in place of the suspected disk.

After information related to the suspected disk is deleted from the error region management table 102 by the information management unit 112, the access unit 116 decouples the suspected disk from the RAID apparatus 1. The new storage device 200 having been incorporated into the RAID apparatus 1 to replace the suspected disk may be used as an HS 31.

It is to be noted that, also when an error occurs with an HS 31 that constitutes the backup region 30, a backup process may be performed similarly as in the case where an error occurs in a storage device 200.

Further, in the RAID apparatus 1, a backup region 30 including HSs 31 of high performance disks such as SSDs and another backup region 30 including HSs 31 of low performance disks such as HDDs or online disks may be defined separately from each other. This makes it easy for the backup determination unit 113 to select a backup region 30.

Furthermore, the backup determination unit 113 may select a plurality of backup regions 30 as a region for performing backup of data. By this, the HSs 31 serving as the backup destination are distributed, and the backup process may be performed in a short time.

Figure 7:
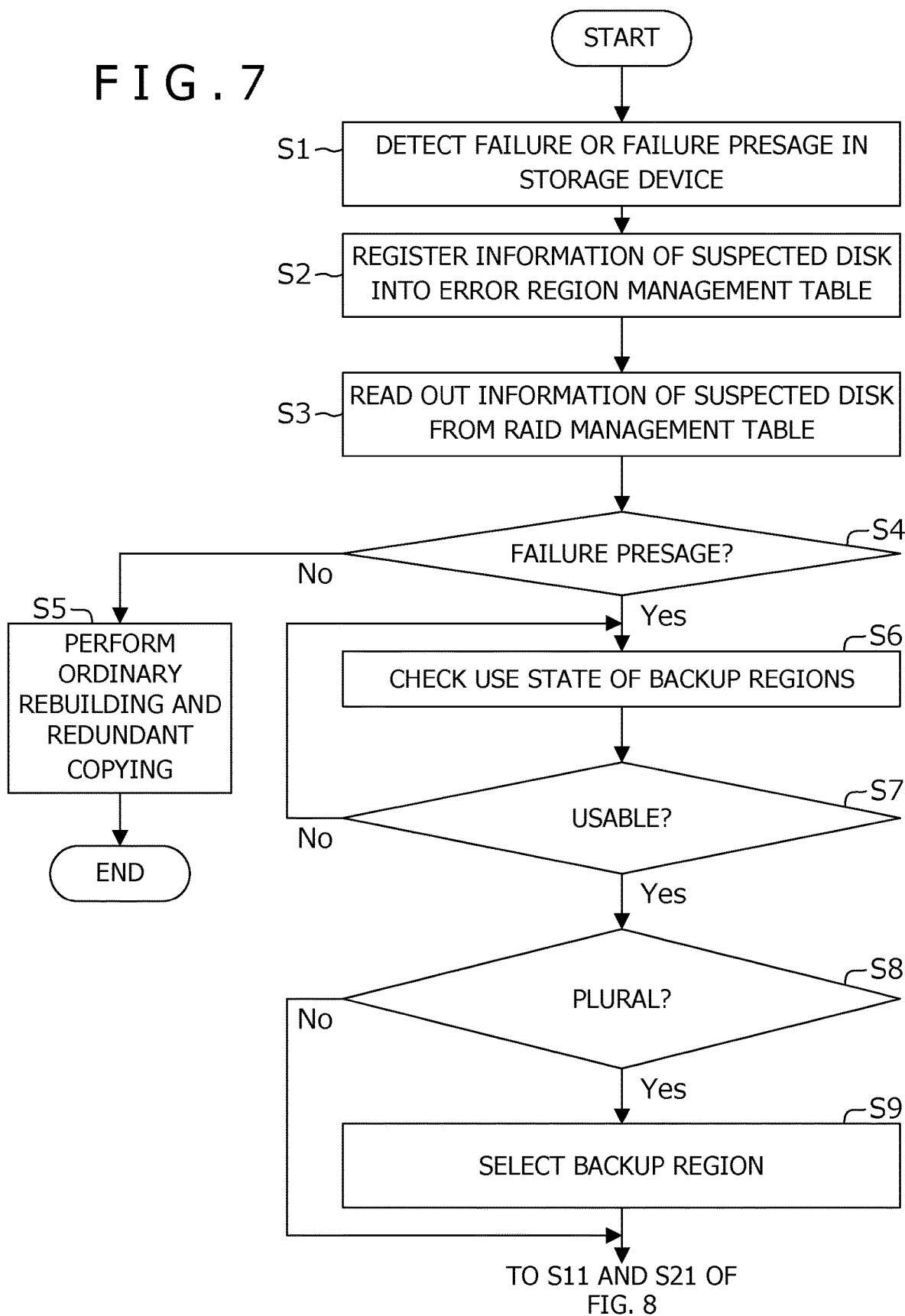
FIG. 7 is a flowchart illustrating a flow of a backup region determination process performed by a RAID apparatus illustrated in FIG. 1.

A backup region determination process performed by the RAID apparatus 1 according to the embodiment is described with reference to a flowchart illustrated in FIG. 7.

The failure detection unit 111 detects a failure or a failure presage in a storage device 200 (S1).

The information management unit 112 registers information regarding a suspected disk into the error region management table 102 (S2).

The backup determination unit 113 reads out information regarding the suspected disk from the RAID management table 101 (S3).

The backup determination unit 113 determines whether the error substance is a failure presage (S4).

In a case where the error substance is not a failure presage (No in S4), the RAID apparatus 1 performs ordinary rebuilding and redundant copying (S5). Then, the process is ended.

In a case where the error substance is a failure presage (Yes in S4), the backup determination unit 113 refers to the backup region management table 104 to check a use state of the backup regions 30 (S6).

The backup determination unit 113 determines whether any usable backup regions 30 exist (S7).

In a case where no usable backup region 30 exists (No in S7), the process returns to S6. The backup determination unit 113 may perform the check at S6 at intervals of a given period of time (for example, at intervals of ten minutes).

In a case where some usable backup regions 30 exist (Yes in S7), the backup determination unit 113 determines whether a plurality of usable backup regions 30 exist (S8).

Figure 8:
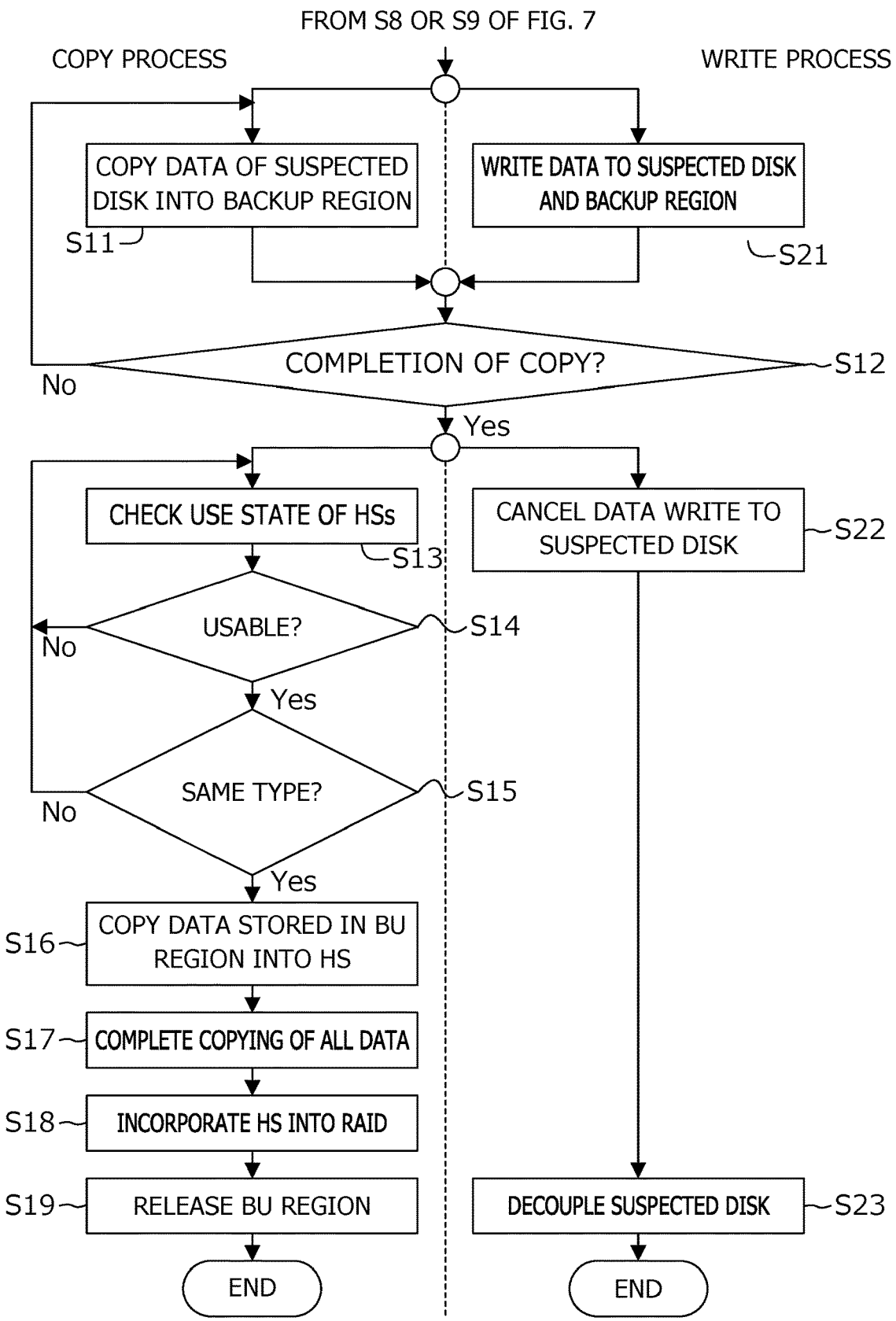
FIG. 8 is a flowchart illustrating a flow of a copy process and a write process performed by a RAID apparatus illustrated in FIG. 1.

In a case where only one backup region 30 exists (No in S8), the process advances to S11 and S21 of FIG. 8.

In a case where a plurality of usable backup regions 30 exist (Yes in S8), the backup determination unit 113 selects an HS 31 used for backup from among backup candidates on the basis of a predetermined priority rank (S9). Thereafter, the process advances to S11 and S21 of FIG. 8.

Now, a copy process and a write process performed by the RAID apparatus 1 according to the embodiment are described with reference to a flowchart illustrated in FIG. 8.

The copy unit 114 copies the data stored in the suspected disk into the backup region 30 (S11).

In parallel to S11, in accordance with a write request received from the host apparatus 4, the write unit 115 writes data, which is specified in the write request, to both the suspected disk and the backup region 30. That is, the write unit 115 writes the data to the suspected disk and the backup region 30 in parallel (S21). The write unit 115 writes the data in parallel into a plurality of HSs 31 constituting the backup region 30.

The copy unit 114 determines whether the data copy to the backup region 30 is completed (S12).

In a case where the data copy to the backup region 30 is not completed (No in S12), the process returns to S11.

In a case where the data copy to the backup region 30 is completed (Yes in S12), the copy unit 114 refers to the backup region management table 104 to check a use state of the HSs 31 (S13).

The copy unit 114 determines whether any usable HSs 31 exist (S14).

In a case where no usable HS 31 exists (No in S14), the process returns to S13.

In a case where some usable HSs 31 exist (Yes in S14), the copy unit 114 determines whether any of the usable HSs31 are HSs 31 of a type same as that of the suspected disk (S15).

In a case where no usable HS 31 is an HS 31 of the type same as that of the suspected disk (No in S15), the process returns to S13.

In a case where some usable HSs 31 are HSs 31 of the type same as that of the suspected disk (Yes in S15), the copy unit 114 copies the data stored in the backup region 30 into one of the usable HSs 31 of the type same as that of the suspected disk (S16).

When the copy of all data stored in the backup region 30 into the one HS 31 is completed (S17), the access unit 116 incorporates the one HS 31 into the RAID group 20 including the suspected disk (S18).

It is to be noted that, in a case where no HS 31 of the type same as that of the suspected disk exists in the RAID apparatus 1, the copy unit 114 may copy the data copied to the backup region 30 directly into the storage device 200 which replaces the suspected disk.

The information management unit 112 deletes "in-use" flag registered in the backup region management table 104 to release the backup region 30 (S19). Thereafter, the copy process is ended.

In a case where the data copy to the backup region 30 is completed (Yes in S12), the write unit 115 cancels data write to the suspected disk, which is to be performed in accordance with the write request received from the host apparatus 4 (S22).

The access unit 116 decouples the suspected disk from the RAID apparatus 1 (S23) and ends the write process.

As described above, in a case where a failure presage is detected by the failure detection unit 111, the copy unit 114 copies data stored in a suspected disk into a backup region 30 including a RAID. In a case where a failure presage is detected by the failure detection unit 111, the write unit 115 writes data, which is specified in a write request received from the host apparatus 4, into the suspected disk in accordance with the write request and also into the backup region 30. The copy unit 114 further copies the data stored in the backup region 30 into a predetermined HS 31. Then, the access unit 116 performs an access to the predetermined HS 31, in place of the suspected disk, in accordance with a write request.

Consequently, data may be certainty guaranteed. For example, since the data is written and stored into a backup region 30 including a RAID, the data may be preserved (or guaranteed) at an early stage and the influence of the copy on data access may be reduced. Even when the predetermined HS 31 has a low access performance, data copy into the predetermined HS 31 may be performed over time during an arbitrary period of time in which an access request is less frequently received from the host apparatus 4. In a case where unused regions of the storage devices 200 are used as the temporary backup destination of data, the storage devices 200 may fail during the backup operation. However, since the backup region 30 includes a RAID, the data may be guaranteed. Further, a backup process may be started rapidly irrespective of the configuration of the backup region 30 that is used for the backup process.

In a case where only one storage device is included in the backup region 30, the copy unit 114 copies data stored in the suspected disk into the one HS 31 (or unused regions of the one storage device 200) included in the backup region 30. Further, in a case where only one storage device is included in the backup region 30, the write unit 115 writes data, which is written into the suspected disk, into the one HS 31 (or unused regions of the one storage device 200) included in the backup region 30. Consequently, even in a case where only one storage device is included in the backup region 30, the backup operation may be performed.

In a case where a plurality of backup regions 30 are available, the backup determination unit 113 selects a backup region 30 that includes an HS 31 having the highest writing speed. Consequently, backup of data may be completed in a short time, and the possibility that the suspected disk fails during the backup process and data loss is caused may be reduced.

The copy unit 114 selects a storage device of a type same as that of the storage device 200 in which a failure presage is detected as an HS 31 to be incorporated into the RAID group 20 in place of the storage device 200 in which the failure presage is detected. Consequently, since the configuration of the RAID apparatus 1 does not change before and after the detection of a failure presage, the reliability of the RAID apparatus 1 may be improved.

When data copy into the backup region 30 performed by the copy unit 114 is completed, the write unit 115 may cancel data write into the storage device 200 in which the failure presage is detected. Consequently, the storage device 200 in which the failure presage is detected may be decoupled from the RAID apparatus 1 at an early stage and may be replaced with a normal storage device 200.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage control device, comprising:
  a memory; and
  a processor coupled to the memory and the processor configured to:
    detect a failure presage in a first storage device;
    perform first copy of copying first data into a first backup region upon detecting the failure presage, the first data being stored in the first storage device, the first backup region including a redundant array of inexpensive disks;
    perform first write of writing second data to the first storage device and second write of writing the second data into the first backup region upon receiving a first write request from a host apparatus while performing the first copy, the second data being specified in the first write request;
    cancel the first write upon completing the first copy;
    perform second copy of copying third data to a second storage device upon completing the first copy, the third data being stored in the first backup region; and
    perform third write of writing fourth data to the second storage device in place of the first storage device upon receiving a second write request from the host apparatus, the second write request being received after completion of the second copy, the fourth data being specified in the second write request.

2. The storage control device according to claim 1, wherein the processor is configured to: copy the first data to a third storage device and write the second data to the third storage device in a case where the first backup region includes only the third storage device.

3. The storage control device according to claim 1, wherein the processor is configured to: selects, as the first backup region, a backup region including a storage device having a highest writing speed among a plurality of backup regions.

4. The storage control device according to claim 1, wherein the processor is configured to: select, as the second storage device, a storage device of a type same as a type of the first storage device.

5. A storage apparatus, comprising:
  a plurality of storage devices; and
  a storage control device, including:
  a memory; and
  a processor coupled to the memory and the processor configured to:
    detect a failure presage in a first storage device of the plurality of storage devices;
    perform first copy of copying first data into a first backup region upon detecting the failure presage, the first data being stored in the first storage device, the first backup region including a redundant array of inexpensive disks;
    perform first write of writing second data to the first storage device and second write of writing the second data into the first backup region upon receiving a first write request from a host apparatus while performing the first copy, the second data being specified in the first write request;
    cancel the first write upon completing the first copy;
    perform second copy of copying third data to a second storage device of the plurality of storage devices upon completing the first copy, the third data being stored in the first backup region; and
    perform third write of writing fourth data to the second storage device in place of the first storage device upon receiving a second write request from the host apparatus, the second write request being received after completion of the second copy, the fourth data being specified in the second write request.

6. The storage apparatus according to claim 5, wherein the processor is configured to: copy the first data to a third storage device of the plurality of storage devices and write the second data to the third storage device in a case where the first backup region includes only the third storage device.

7. The storage apparatus according to claim 5, wherein the processor is configured to: selects, as the first backup region, a backup region including a storage device having a highest writing speed among a plurality of backup regions.

8. The storage apparatus according to claim 5, wherein the processor is configured to: select, as the second storage device, a storage device of a type same as a type of the first storage device.

9. A non-transitory computer-readable recording medium having stored therein a program that causes a computer to execute a process, the process comprising:
  detecting a failure presage in a first storage device;
  performing first copy of copying first data into a first backup region upon detecting the failure presage, the first data being stored in the first storage device, the first backup region including a redundant array of inexpensive disks;
  performing first write of writing second data to the first storage device and second write of writing the second data into the first backup region upon receiving a first write request from a host apparatus while performing the first copy, the second data being specified in the first write request;
  canceling the first write upon completing the first copy;
  performing second copy of copying third data to a second storage device upon completing the first copy, the third data being stored in the first backup region; and
  performing third write of writing fourth data to the second storage device in place of the first storage device upon receiving a second write request from the host apparatus, the second write request being received after completion of the second copy, the fourth data being specified in the second write request.

10. The non-transitory computer-readable recording medium according to claim 9, the process further comprising: copying the first data to a third storage device and write the second data to the third storage device in a case where the first backup region includes only the third storage device.

11. The non-transitory computer-readable recording medium according to claim 9, the process further comprising: selecting, as the first backup region, a backup region including a storage device having a highest writing speed among a plurality of backup regions.

12. The non-transitory computer-readable recording medium according to claim 9, the process further comprising: selecting, as the second storage device, a storage device of a type same as a type of the first storage device.

\* \* \* \* \*